United States Patent
Gearhart

[19]

[11] Patent Number: 5,921,742
[45] Date of Patent: Jul. 13, 1999

[54] ARTICULATING ROLL-OFF TRAILER

[75] Inventor: Brian O. Gearhart, Allen Park, Mich.

[73] Assignee: Benlee, Inc., Romulus, Mich.

[21] Appl. No.: 08/840,515

[22] Filed: Apr. 21, 1997

Related U.S. Application Data

[63] Continuation-in-part of application No. 08/543,603, Oct. 16, 1995, abandoned.

[51] Int. Cl.⁶ ..................................................... B60P 1/64
[52] U.S. Cl. ...................... 414/480; 414/483; 414/494; 414/500; 414/501; 414/529
[58] Field of Search .................................... 414/469, 470, 414/476, 480, 481, 482, 483, 484, 485, 491, 537, 494, 500, 501, 529; 294/8 R, 8 H, 11

[56] References Cited

U.S. PATENT DOCUMENTS

| | | |
|---|---|---|
| 647,284 | 4/1900 | Wetmore . |
| 986,604 | 3/1911 | Stuckwisch . |
| 1,442,769 | 1/1923 | Jackson et al. . |
| 1,730,480 | 10/1929 | Shirreff . |
| 2,408,862 | 10/1946 | Lisota .................................. 214/85 |
| 2,517,933 | 8/1950 | Schonrock ........................... 298/19 |
| 2,628,733 | 2/1953 | Hale ..................................... 214/506 |
| 2,662,655 | 12/1953 | Sellers ................................. 214/523 |
| 2,696,928 | 12/1954 | Faircloth et al. ................... 214/506 |
| 2,717,707 | 9/1955 | Martin ................................ 214/505 |
| 2,741,383 | 4/1956 | Leckert ............................... 214/505 |
| 3,361,477 | 1/1968 | Pitts .................................... 298/8 R |
| 3,406,852 | 10/1968 | Winckler ............................ 214/506 |
| 3,471,047 | 10/1969 | Burke .................................. 414/477 |
| 3,485,400 | 12/1969 | Pewthers ............................ 214/505 |
| 3,618,801 | 11/1971 | Blanchard .......................... 214/501 |
| 3,934,740 | 1/1976 | Rumell ............................... 214/505 |
| 3,945,521 | 3/1976 | Decker ............................... 214/506 |
| 4,130,211 | 12/1978 | Abascal .............................. 214/505 |
| 4,133,440 | 1/1979 | Heidrick, Jr. ...................... 214/506 |
| 4,222,698 | 9/1980 | Boelter ............................... 414/477 |
| 4,243,353 | 1/1981 | Reed ................................... 414/439 |
| 4,318,658 | 3/1982 | McIntyre ............................ 414/480 |
| 4,391,562 | 7/1983 | Hetzner .............................. 414/483 |
| 4,417,841 | 11/1983 | Chadwick .......................... 414/346 |
| 4,593,810 | 6/1986 | Cook ................................... 198/781 |
| 4,630,991 | 12/1986 | Landoll et al. .................... 414/478 |
| 4,645,405 | 2/1987 | Cambiano .......................... 414/494 |
| 4,746,261 | 5/1988 | Landoll et al. .................... 414/475 |
| 4,801,153 | 1/1989 | Wilson ............................... 280/414.1 |
| 4,840,532 | 6/1989 | Galbreath .......................... 414/479 |
| 4,887,937 | 12/1989 | Thunnissen ....................... 414/527 |
| 4,934,898 | 6/1990 | Galbreath .......................... 414/786 |
| 4,958,978 | 9/1990 | Shedleski .......................... 414/483 |
| 4,984,962 | 1/1991 | Jarvinen ............................ 414/786 |
| 4,986,719 | 1/1991 | Galbreath .......................... 414/478 |
| 5,007,791 | 4/1991 | Boughton .......................... 414/494 |
| 5,016,896 | 5/1991 | Shafer ................................ 280/400 |
| 5,088,875 | 2/1992 | Galbreath et al. ................. 414/478 |
| 5,203,668 | 4/1993 | Marmur ............................. 414/500 |
| 5,234,308 | 8/1993 | Mann .................................. 414/469 |
| 5,246,329 | 9/1993 | Farrell ................................ 414/478 |
| 5,246,330 | 9/1993 | Marmur et al. ................... 414/494 |
| 5,460,473 | 10/1995 | Lamora et al. .................... 414/494 |

FOREIGN PATENT DOCUMENTS

| | | |
|---|---|---|
| 1594063 | 7/1981 | European Pat. Off. . |
| 6123 | 6/1906 | France . |
| 61.610 | 5/1955 | France . |
| 2360825 | 6/1975 | Germany . |
| 3941 | of 1901 | United Kingdom . |

*Primary Examiner*—Thomas J. Brahan
*Attorney, Agent, or Firm*—Gifford, Krass, Groh, Sprinkle, Anderson & Citkowski, PC

[57] ABSTRACT

A roll-off trailer includes an articulating hinge and at least one hydraulic cylinder associated therewith to control the relative movement of fore and aft sections between a first position wherein the fore and aft sections lie substantially in the same horizontal plane during container transport, and a second position wherein the fore and aft sections are articulated to facilitate container loading, unloading and dumping. A pair of fore and aft winches and appropriate cabling may be used to transfer containers on the leveled trailer bed, or alternatively, powered rollers and/or a slide assembly may be used. To assist in dumping and to facilitate loading and unloading in low-ceiling environments, the aft section may be fitted with an optional extensible tail section.

16 Claims, 5 Drawing Sheets

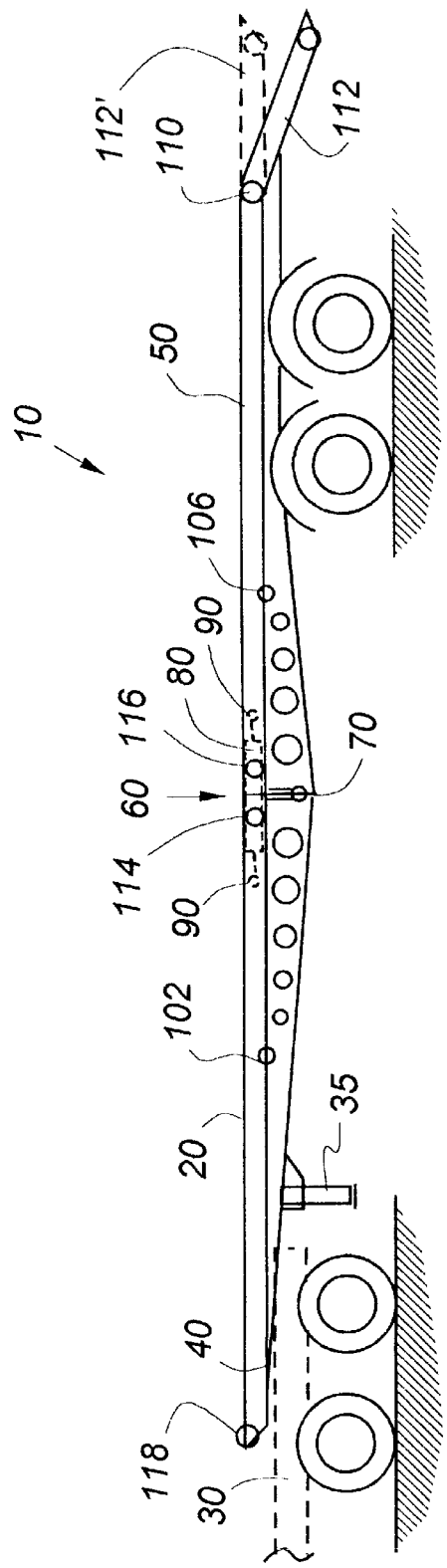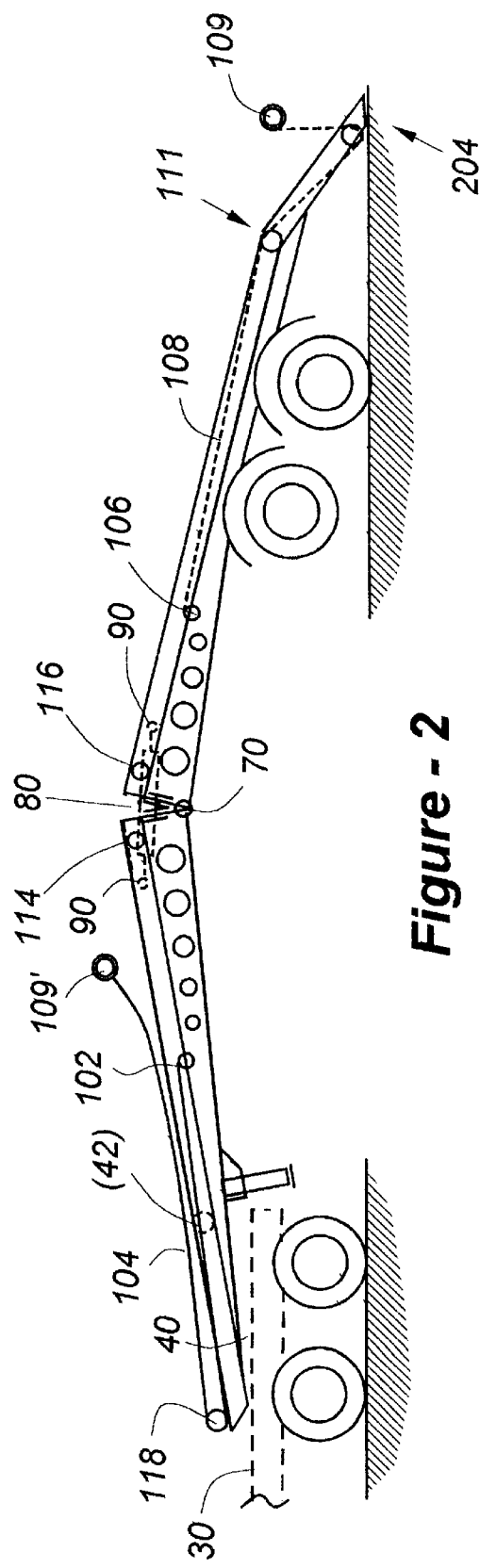

ARTICULATING ROLL-OFF TRAILER

REFERENCE TO RELATED APPLICATION

This application is a continuation-in-part of U.S. patent application Ser. No. 08/543,603, filed Oct. 16, 1995, now abandoned.

FIELD OF THE INVENTION

This invention relates generally to container-hauling or "roll-off" type trailers, and, more particularly, to such a trailer which articulates at a point along its length to improve the way in which containers are loaded, unloaded and dumped.

BACKGROUND OF THE INVENTION

In hauling containers for transporting scrap, waste, or for recycling purposes, and so forth, it is common to employ roll-off trailers. With such a trailer, a portion of the structure remains horizontally oriented and connected to the axles and cab or tractor by way of a king-pin assembly, whereas a second portion of the structure pivots upwardly from a rearward joint, enabling the containers to be pulled up and onto the trailer from the ground, transported, unloaded and/or dumped. To facilitate the unloading procedure, the pivoting portion is again raised up, enabling the container(s) to roll off and back onto the ground, hence the name "roll-off" trailer.

There are many different types and styles of roll-off trailers in service today, depending upon the application at hand. For light-duty applications, a single-container or "one-box" design may be sufficient, and may employ only a few axles. Such a configuration would be suited, for example, to the short-distance hauling of smaller roll-off style containers. On the other end of the spectrum, for long-distance hauling of very heavy materials, a multi-axle "two-box design" could instead be employed. Benlee, Inc., the assignee of this application, manufacturers a full range of such trailers, and examples thereof are provided in its catalog.

One potentially undesirable feature of the conventional roll-off design concerns the fact that the framework used to load and unload the containers must be pivoted at a pronounced angle with respect to the ground in some cases, resulting in weight-balancing considerations, particularly if a full, heavy container is pulled to the greatest extent possible on a frame at its most pronounced elevation. The two-box design presents further engineering challenges, since it is impractical, if not unsafe, to build a framework capable of pulling two containers all the up an incline before lowering the frame back onto the horizontal trailer structure. For this reason, two-box trailer designs have evolved separately, and usually include a rear portion which inclines in combination with some mechanism for moving the first loaded box forwardly toward the cab, at which time the rear portion may again be inclined so as to receive the second container. Unloading is essentially carried out with a reverse process. U.S. Pat. No. 5,246,330 describes one of many such two-box designs.

Regardless of trailer type, in the roll-off industry, as with many trucking applications, trade-offs exist between performance and weight. While it might be advantageous to build trailers with the strongest possible members and the greatest variety of operational modes, the hydraulic cylinders, winches, and other drive means add considerable weight. This additional weight not only affects fuel economy, but different states place different upper limits on load carrying capacity, such that the heavier the trailer, the less it may be able to carry, thereby defeating its intended purpose. Two-box styles are particularly susceptible to weight problems, since both the underlying portion which remains horizontal and the part which pivots to load and unload the containers must be very substantial and so must the hydraulic cylinders and other operational components involved. As such, any improved design capable of maintaining or enhancing performance in the roll-off industry would be welcomed, particularly if, at the same time, the resulting empty or "tare" weight is maintained or, ideally, reduced.

SUMMARY OF THE INVENTION

The present invention provides a roll-off type of trailer having an articulating hinge at a point along its length, thereby improving the way in which containers are loaded, unloaded, or dumped. Broadly, the trailer includes fore and aft sections connected by way of this articulating hinge. The fore section includes a forward end adapted for attachment to a tractor and a rearward end forming the first part of the hinge. The aft section has a forward end forming the second part of the hinge and a rearward end associated with the loading, unloading and/or dumping of a container.

At least one hydraulic cylinder associated with the hinge is preferably used to control the relative movement of the fore and aft sections between a first position wherein they lie substantially in the same horizontal plane during container transport, and a second position wherein the fore and aft sections are articulated to facilitate the container loading, unloading and/or dumping.

Means are provided for transferring separate containers onto, and off of, the trailer sections. In one embodiment, a pair of winches are provided for this purpose, one each associated with the fore and aft sections. Cabling, including container attachment means and moveable between and under the control of the two winches, is used to perform container movement on the trailer bed in the unarticulated position.

Alternatively, the means for transferring containers onto, and off of, the trailer includes means for powering at least a subset of the rollers attached to the rails which make up the frame of the trailer bed. The rollers on either, or both, sides of the trailer may be powered. As a further alternative, one or more slide assemblies may be used for cable pulling.

These container movement facilities may be independently incorporated with respect to the fore and aft sections, enabling various combinations to be utilized according to the invention. For example, a winch or slide assembly may be used to pull a container onto the aft section with the trailer in an articulated configuration, then, having straightened out the trailer bed, powered rollers may be used to transfer the container to, and from, the fore section. As another example, a winch, slide assembly, or powered rollers may be used to transfer a container from the fore to the aft section in an unarticulated position, with the weight of the container itself being used for unloading through the articulation process.

To assist in dumping, and to facilitate loading and unloading in low-ceiling environments, the aft section may be fitted with an optional extensible tail section.

BRIEF DESCRIPTION OF THE DRAWINGS

FIG. 1 is a side-view schematic rendition of a trailer constructed in accordance with this invention in an unarticulated position;

FIG. 2 shows the trailer of FIG. 1 in an articulated position associated with container loading and unloading;

DETAILED DESCRIPTION OF THE PREFERRED EMBODIMENT

Figure 3:
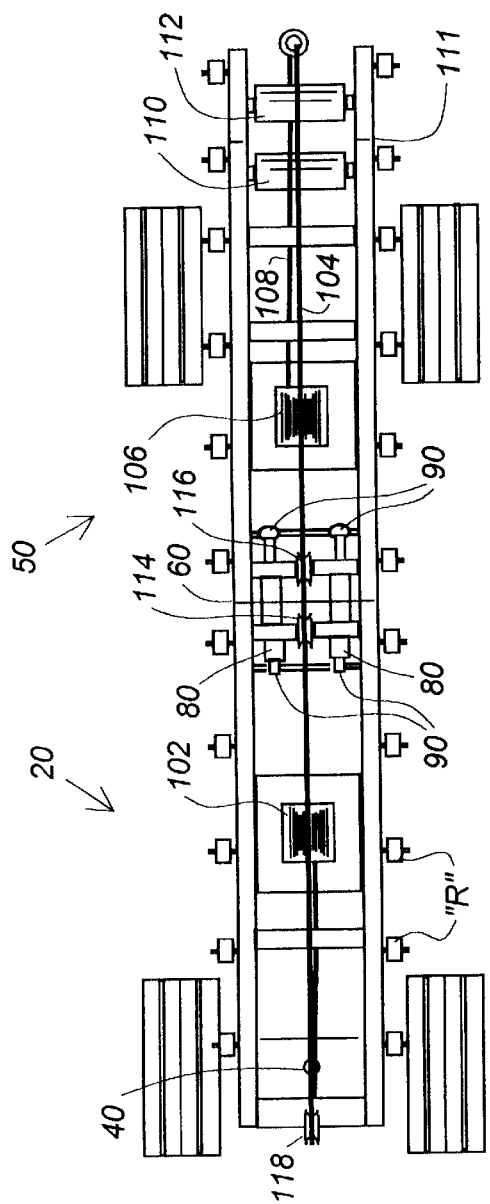
FIG. 3 is a top-view schematic representation of the trailer of FIGS. 1 and 2.

The present invention resides in a roll-off type of trailer used, for example, to load, transport and unload containers for various purposes, including waste and scrap hauling, recycling, and so forth. The cited references provide various examples of such trailers and, in some cases, illustrate certain of the container types applicable to this invention. Although the trailer may be used in conjunction with a single container, further advantageous features of the system are realized in a two-box configuration, as described herein below.

FIG. 1 is a simplified side-view drawing of a trailer, shown generally at 10 constructed in accordance with the invention. Broadly, the trailer 10 includes a fore section 20 which extends from a forward pulley or sheave 118 to a point 60 which separates upon articulation, and an aft section 50 which extends from this region 60 to the tail end just behind a roller 112. In this configuration winches are used to both load and unload multiple containers. Other drawings and accompanying descriptions will be used to illustrate alternative trailer movement mechanisms, including powered rollers, and slide assemblies for cable pulling, which may be deployed exclusively or in combination with any of the other mechanisms disclosed herein.

The fore section 20 releasably engages with, and attaches to, a cab or tractor 30 having a king-pin assembly facilitating a certain degree of movement and pivoting action in the vicinity at 40. Such a releasable connection is standard in the trucking industry, and made possible by virtue of hydraulic jacks 35. A pivot point 70 facilitates the articulation between the fore section 20 and aft section 50, causing a V-shaped separation to occur at point 60, which is best seen in FIG. 2. Powering this articulation is one or more hydraulic cylinders 80 pivotably attached at both the fore and aft sections at points 90. In the preferred embodiment, two cylinders, each with a five inch diameter and 18 inch stroke are used, and are powered in both directions to facilitate both the articulation and the straightening out of the trailer bed.

To accommodate loading in a manner to be described in detail below, the fore section 20 includes a powered winch 102, and the aft section includes a second winch positioned at point 106 which is used for both loading and unloading. To guide the cabling to and from these winches, the fore section includes a forwardmost sheave or roller 118, and the aft section likewise includes at least one roller shown at 112'. In the event that the rear portion of the aft deck is permanently bent as shown in solid line form in the drawing, two rollers, 110 and 112, are preferably utilized in a manner described below. In addition, two centrally located sheaves 114 and 116 are located just forward and just rearward, respectively, of the section 160 associated with the articulation between the fore and aft sections. The lateral location of the various winches and sheaves are best seen in the top view of FIG. 3.

FIG. 2 is a side-view schematic illustration of the trailer of FIG. 1 shown in an articulated position. The cylinders 80 have been extended, thus causing the fore and aft sections to pivot with respect to the point 70, enabling a rearward point associated with the aft section to touch or come in close proximity to the ground at point 204.

Figure 7:
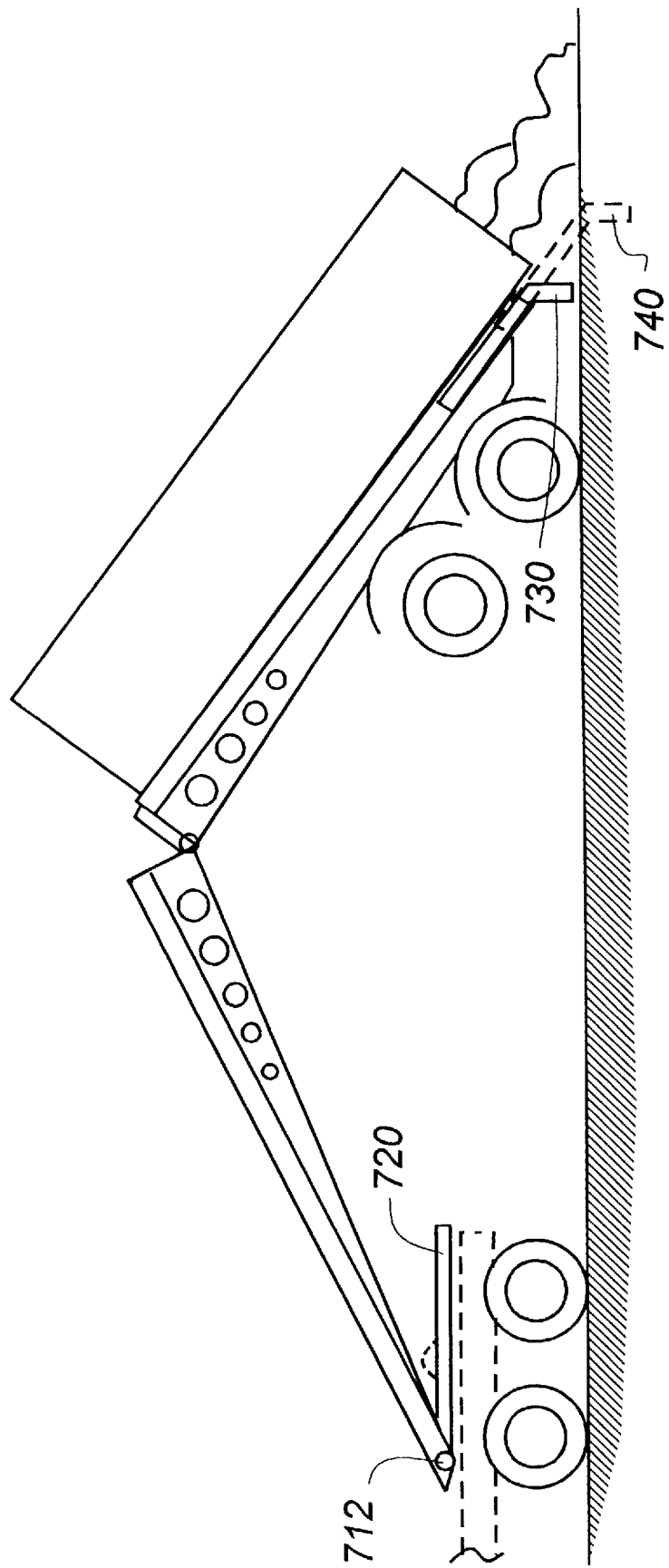
FIG. 7 is an oblique-view illustration of an embodiment of the invention in a dumping position, this figure further illustrating an optional extensible tail section.

In the position shown in FIG. 2, the angle formed between the aft section and the ground is approximately 22 degrees, which is adequate for loading and unloading of containers, but ordinarily insufficient for dumping purposes, which typically requires an angle of at least 45 degrees. For loading and unloading only, there is usually sufficient residual "play" associated with the king-pin pivot point that the fore section 20 may simply angle upwardly as shown in FIG. 2 without the need for any further articulation. However, in the case of a more pronounced angle of articulation associated with dumping, the fore section may be hinged ahead of a separate king-pin plate, enabling the plate to remain essentially horizontal with respect to the cab or tractor as best shown in FIG. 7.

Continuing the reference to FIG. 2, the forward winch 102 includes a forward cable 104 associated with container loading onto the fore section, and the aft section 106 contains a separate cable 108 associated with both loading and unloading as described below. Both these separate cables independently attach to hooks or rings 109 and 109' used to attach to the container at forward and rearward points provided for such purpose.

During hauling, the ends of both cables 104 and 108 are stowed in a rearward portion of the trailer and out of the way. Upon arrival at a container site, an operator first aligns the trailer to the container to be loaded, then articulates the trailer.

Figure 4A:
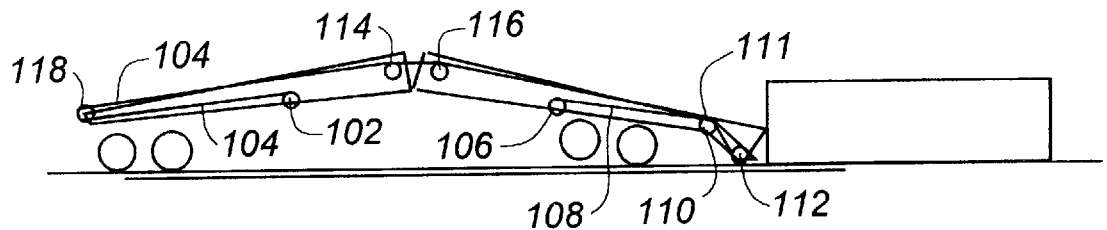
FIGS. 4A to 4E are side-view drawings used to illustrate how a single container is loaded and unloaded from an embodiment of the invention.

FIGS. 4A to 4D illustrate how a single container is best loaded and unloaded from a version of the invention based upon winches. To load the container, a few feet of cables 104 and 108 are let out, respectively, and both are looked onto the front of the container, starting with cable 108. At a control area near the front of the trailer, the operator then puts the rear winch 106 in a free-wheeling position by disengaging its clutch mechanism. The forward cable 104 is first drawn off of the winch 102 and around a forwardmost sheave 118. From there, the cable 104 is dressed over the two sheaves 114 and 116, as shown in FIG. 4A. The rearward cable 108 comes off of the aft winch 106 and, in the case of a bent tail section as shown, is dressed over a roller 110 and under a roller 112 before connection to the front portion of the container. As mentioned, this rearward cable dressing may vary in the event that a straight or stinger-type of tail section is used.

Figure 4B:
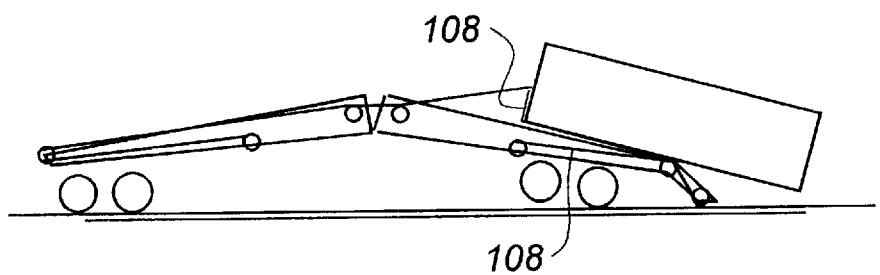
Figure 4C:
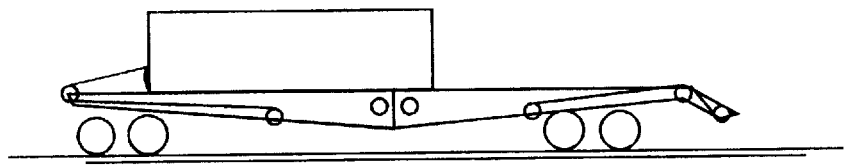
Figure 4D:
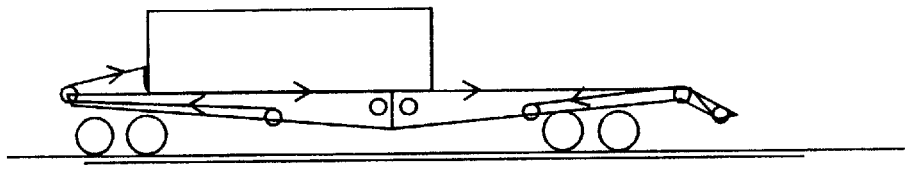

Pulling with the winch 102 causes the container to come up and onto the aft portion of the trailer as shown in FIG. 4B. Since winch 106 is disengaged, cable 108 also gets pulled up along the underside of the container as it is loaded onto the aft section. Once the container is pulled to an extent at least halfway past the breakpoint 111, it is completely on board and the two halves may be unarticulated. Once the bed is straightened, the container may be pulled all the way to the front of the aft section. In the case of a single container, the preferred position during transport is related to load balance, which is shown in FIG. 4C. To assist in assuming this position, removable stops are provided which attach on either side of the bed. When engaged, the container will not advance forward and, in fact, are so designed that the container engages more strongly if more forward motion is attempted. To hold the container in place once positioned, nylon hold-downs are used in conjunction with a manual winch which attach and grip the container on either side during transport.

To unload the single container, having removed these nylon hold-downs, the rear winch is engaged. The front winch does not include a free-wheeling position, so the front winch is also activated to let out cable. This embodiment includes a hydraulic mechanism here which keeps the tension between the two winches more or less consistent to prevent them from fighting one another.

Figure 4E:
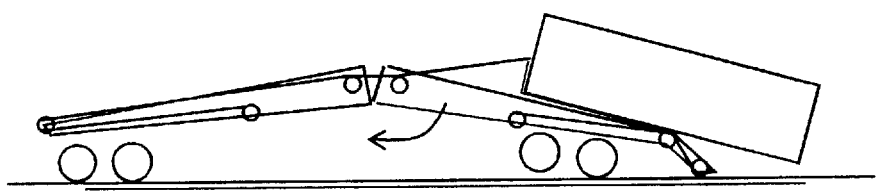

With the two cables attached to the front of the container, it may be completely removed through the action of the rear winch. When the container has moved past the midpoint, the trailer is articulated. The operator may then put the tractor/trailer in neutral and, when the rear edge of the container hits the ground, further pulling on the front of the container simply causes the trailer and the cab to move forward until the container is completely unloaded, as shown in FIG. 4E. Once the container is off, the two hooks are removed and stowed.

Figure 5A:
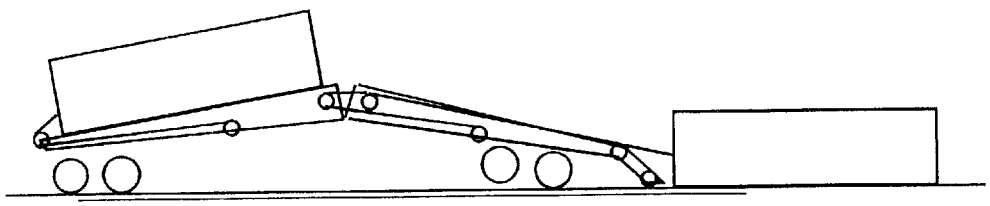
FIGS. 5A to 5F are side-view drawings used to illustrate how two containers may be loaded and unloaded according to one embodiment of the invention.
Figure 5B:
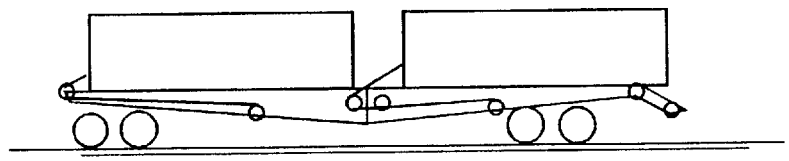
Figure 5C:
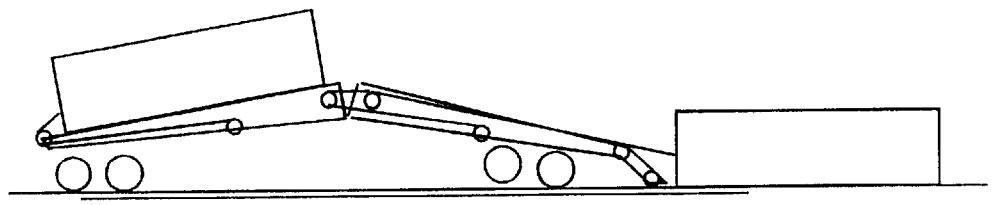

The process used to load two boxes is similar to that used to load a single container, except now the forward winch 102 is attached to the container and used to pull it all the way onto the fore section after straightening out the trailer bed, and the cable associated with the rear winch is not attached at this time. One the container has been pulled up with the front cable attached to it, sheaves 114 and 116 are free for use. The winch 106 is then disengaged and placed in a free spool position and cable 108 is pulled off of the winch 106 and dressed over sheave 116, under 114 and back around, connecting it to the container as shown in FIG. 5A. The trailer is then articulated, and, when it progressed at least halfway past the breakpoint 111, it may be straightened out and the container pulled the rest of the way, as shown in FIG. 5B.

Figure 5D:
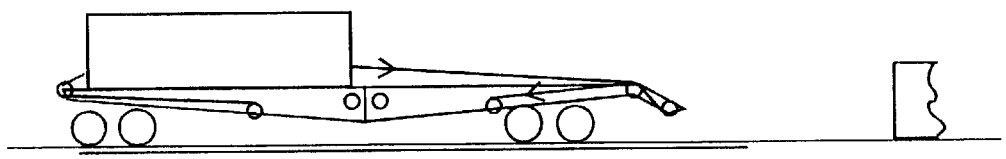
Figure 5E:
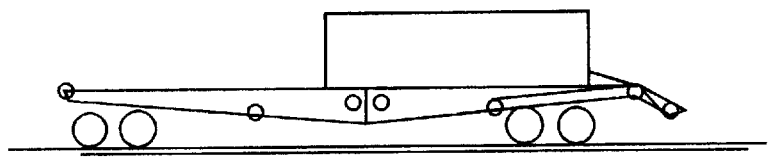
Figure 5F:
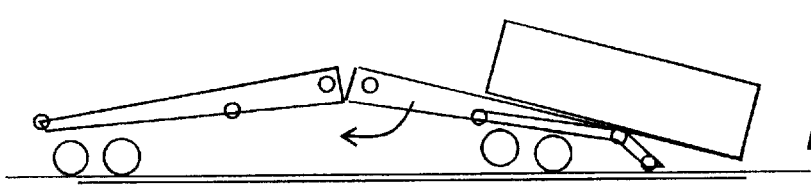

To unload the two containers, the trailer is articulated allowing the rearward box to simply slide off and hit the ground. As with the unloading of a single container, the weight of the container will typically be sufficient to push the whole rig forward and unload. Next the trailer bed is straightened out, as shown in FIGS. 5D and 5E. The cable is taken off of the trailer that has been unloaded, and connected to the back end of the remaining forward container. In so doing, the cable is placed over roller 110 but under roller 112, much like the situation used to pick up and unload a single container, as shown in FIG. 5F.

Although winches are relatively lightweight and inexpensive, they present certain drawbacks. Foremost, since it is impossible to "push a rope," double lengths of cable must be provided to move a container in both directions, that is, for loading and unloading. Dealing with cables in this manner may be a time-consuming process. Therefore, according to this invention, alternative mechanisms are provided to replace either or both of the fore and aft winches. As one alternative, one or more slide assemblies may be used for container pulling, as described below. As a further alternative, the means for transferring containers onto, and off of, the trailer may include means for powering at least a subset of the rollers attached to the rails which make up the frame of the trailer bed. The rollers on either, or both, sides of the trailer may be powered.

These container movement facilities may be independently incorporated with respect to the fore and aft sections, enabling various combinations to be utilized according to the invention. For example, a winch or slide assembly may be used to pull a container onto the aft section with the trailer in an articulated configuration, then, having straightened out the trailer bed, powered rollers may be used to transfer the container to, and from, the fore section. As another example, a winch, slide assembly, or powered rollers may be used to transfer a container from the fore to the aft section in an unarticulated position, with the weight of the container itself being used for unloading through the articulation process.

Reference is made to FIG. 3 for a discussion with respect to the use of powered rollers according to the invention. At least some of the rollers "R" will be power-driven, such that with a container loaded onto the aft section as shown in position "D" of FIG. 4B and the trailer straightened out, as in FIG. 4C, the container may be moved all the way up and onto the fore section. Although these rollers may otherwise be visible in drawings other than FIG. 3, they have been left out of the side views to better show cabling and other features.

At a minimum, at least a couple of the rollers on both the fore and aft sections closest to the articulating hinge on one side of the trailer will be powered according to this embodiment. Preferably, at least some of the rollers on both the fore and aft sections will be powered, enabling a container positioned on the aft section to be moved to and from its full forward extent, thereby obviating the need for an additional mechanism to move containers onto, and off of, the fore section At a maximum, all rollers associated with the trailer may be powered in accordance with the invention. As a compromise, two configurations are preferably used. In one, rollers on both sides of the trailer closest to the hinge on both the fore and aft sections are powered, but the rollers on both sections furthest away from the hinge are not. With such an arrangement, even a container only on the fore section may be moved to the aft section, and vice versa. However, powering the rollers on both sides of the trailer presents certain drive distribution considerations and, should the container be unusually shaped or should the terrain be uneven, weight distribution might not favor container movement using only those rollers closest to the hinge point. Therefore, as an alternative, all or nearly all of the rollers on only one side of the trailer are powered but the rollers on the side incorporate bearings low in friction, enabling them to easily free wheel during forward and backward container transfer.

Apart from the exact configuration relied upon, various alternatives are available for distributing power to the rollers to be driven. For example, separate drive means, such as a hydraulically or electrically driven motor, may be provided for both the fore and aft sections, power being distributed along a main drive shaft in each case, with gear boxes being used to draw power from the main shaft to each roller driven. Such gear boxes may or may not perform a power transformation function, and may be either in line or off axis with regard to the main power shaft run at any angle. For example, the power source may be centrally located within a section of the trailer with power being delivered to the rollers in both directions therefrom. Alternatively, each motor may be close to, or far from, the articulating hinge with each roller deriving power therefrom on a sequential basis. In yet a further configuration, as such rollers will only be moved when the bed is horizontal, a single drive shaft may be used for the entire trailer, which disengages in the vicinity of the hinge point when the trailer is articulated, yet re-meshes when the trailer is horizontal, thus enabling a single motor to drive rollers on both the fore and aft sections.

As discussed above, a slide mechanism may alternatively be used to carry out container pulling or loading. Using a slide mechanism, one or more hydraulic cylinders are disposed between a stationary member and a movable slide, and a cable is wrapped or reeved between the two pulleys so that when the slidable portion is pushed away from the stationary member by the cylinder(s), the cable is taken up at a rate determined by the parts of the reeving, and, if attached to a container, results in a nicely efficient pulling apparatus.

Such slide-type pulling mechanisms are well known in the roll-off trailer industry, but nearly all such systems rely upon large, heavy twin hydraulic cylinders, and an off-axis reeving arrangement requiring brute force to move the slide, particularly with the cable heavily loaded. The slide mechanism shown in U.S. Pat. No. 4,840,532 is typical in this regard.

Figure 6:
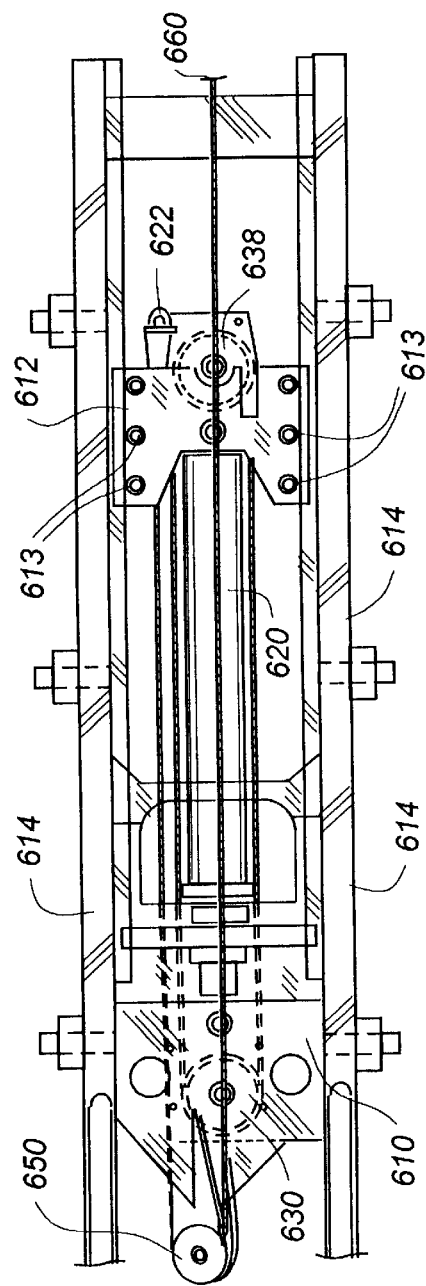
FIG. 6 is a drawing which shows an alternative embodiment of the invention incorporating a slide assembly for cable pulling.

The present invention therefore preferably provides a reverse block-and-tackle type of cable-pulling system shown in FIG. 6 which is more efficient, lighter in weight, and compact as compared to prior art systems. Such efficiency is gained in several ways. First, a single hydraulic cylinder 620 is supported centrally within the slide frame 614 to push on a center portion of a slide plate 612, thereby reducing weight and minimizing torque on the slide plate as it is moved. Also, in the preferred embodiment, a plurality of rollers 613 are used between the slide plate 612 and the frame to further reduce friction. As such, friction is reduced to the extent that a single telescoping-type cylinder may be used instead of the much heavier, twin single-acting arrangement. Additionally, the cable is reeved around the cylinder in a manner enveloping the cylinder, thus keeping the bound end of the cable 622 and the free end 660 as close as possible to the central region of the slide frame. Even though one or all of the pulleys (i.e., 630, 636, and 650) may be greater in diameter than the height of the frame itself, they are preferably placed at rotational angles with respect to the frame and/or one another, so that substantially all of the mechanism is contained with the volume defined by the slide frame. This slide assembly or alternative prior-art devices may be used either on the aft or fore sections, the latter placement enabling a container to be pulled all the up and onto the fore section through the use of a slide assembly.

The container movement facilities discussed above may be independently incorporated with respect to the fore and aft sections, enabling various combinations to be utilized according to the invention, as follows:

|   | winch | slide | rollers | weight |
|---|---|---|---|---|
| To load onto aft section: | x | x | | |
| To transfer to fore section: | x | x | x | |
| To transfer to aft section: | x | x | x | |
| To unload from aft section: | x | x | x | x |

In addition, as discussed above, the invention is not only applicable to container loading, unloading and hauling, but may also be adapted to provide a dumping function from the container positioned on the aft portion, assuming the container is equipped for dumping with a single or twin barn-type doors. FIG. 7 illustrates a trailer according to this invention configured for dumping, and, at the same time, better illustrates certain other optional features, including a hinge point 712 just forward of the king-pin plate 720, as well as various alternative embodiments associated with the tail section. Note that such dumping may occur from the rearward container whether or not a second container is loaded on the fore section, and whether or not such forward container is filled or empty.

In terms of the tail section, the alternative configurations include a solid tailpiece, either straight, as depicted in broken-line fashion in FIG. 1 or bent, as depicted in solid-line form, also in FIG. 1. Alternatively, an extensible or "stinger"-type of tail may be used, and this too may either be straight and in alignment with the tracks of the frame, or, alternatively, bent downward either with a sharp corner, or with a continuous curve. FIG. 7 illustrates a bent stinger tail in a retracted position 730 and an extended position 740. Such a stinger tail may further either be manually operated or, preferably power driven, for example with one or more additional, though smaller, hydraulic cylinders.

The advantage of having an extensible tail is that it may be retracted for dumping, as shown in the figure. An advantage of having an extensible and downwardly bent stinger is that, depending upon the length of the extension and the angle of bend, and so forth, the tailpiece may be caused to touch the ground even with a very slight degree of articulation. Such a configuration may be necessary, for example, for loading and/or unloading inside of buildings having a low clearance height. That is, with a long extensible tail having a pronounced downward bend, a very small degree of articulation with the aft section being at an angle of only a few degrees with respect to the ground, may nevertheless support a loading and/or unloading operation.

Having thus described my invention, I claim:

1. An articulating trailer capable of loading, unloading and transporting two containers, comprising:

a fore section having a forward end adapted for attachment to a tractor and a rearward end forming the first part of a two-part hinge having a pivot point;

an aft section having a forward end forming the second part of the two-part hinge and a rearward end associated with loading and unloading the containers;

the aft section includes a set of load-bearing wheels, with the hinge being located forwardly of the wheels associated with the aft section;

at least one hydraulic cylinder positioned above the pivot point to control the relative movement of the fore and aft sections between a first position wherein the fore and aft sections lie substantially in the same horizontal plane during container transport, and a second position wherein the cylinder is extended, causing the fore and aft sections to articulate in such a way that the rearward end of the aft section is brought proximate to the ground for container loading and unloading; and means for transferring separate containers onto and off of both trailer sections, including a plurality of powered rollers associated with both the forward and aft sections to facilitate container movement therebetween.

2. The articulating trailer of claim 1, wherein rollers on both sides of the trailer are powered.

3. The articulating trailer of claim 1, wherein rollers on only one side of the trailer are powered, with bearing rollers being used on the other side of the trailer to facilitate container transfer.

4. The articulating trailer of claim 1, wherein the aft section includes a cable-pulling slide assembly for loading and unloading a container onto the aft section.

5. The articulating trailer of claim 1, wherein the fore section includes a slide assembly for loading and unloading a container onto the fore or aft sections.

6. The articulating trailer of claim 1, wherein the degree of articulation is sufficient to dump the contents of a container positioned on the aft section.

7. The articulating trailer of claim 1, wherein the aft section further includes an extensible tail section.

8. The articulating trailer of claim 7, wherein the extensible tail section includes a downward bend enabling containers to be loaded and unloaded at a lesser degree of articulation than would otherwise be possible.

9. The method of loading and unloading first and second containers onto and off of a trailer, comprising the steps of:

provviding a trailer having an articulating bed frame with a point of articulation between a fore section and an aft section with a rearward end, the point of articulation comprising a hinge having a pivot point, each of the fore and aft sections including powered rollers associated with container loading and unloading, the trailer having at least one hydraulic cylinder positioned above the pivot point for articulating the trailer, and, with respect to loading:

extending the cylinder to articulate the trailer so that the rearward end touches the ground;

pulling the first container onto the aft section;

retracting the cylinder to unarticulate the fore and aft sections;

transferring the first container to the fore section over and past the point of articulation using the powered rollers on the fore and aft sections;

extending the cylinder to articulate the trailer so that the rearward end touches the ground;

pulling the second container onto the aft section; and retracting the cylinder to unarticulate the fore and aft sections; and, with respect to unloading:

extending the cylinder to articulate the trailer so that the rearward end touches the ground and the second container rolls off the aft section;

retracting the cylinder to unarticulate the fore and aft sections;

transferring the first container to the aft section over and past the point of articulation using the powered rollers on the fore and aft sections; and extending the cylinder to articulate the trailer so that the rearward end touches the ground and the first container rolls off the aft section.

10. An articulating trailer capable of loading, unloading and transporting two containers, comprising:

a fore section having a forward end adapted for attachment to a tractor and a rearward end forming the first part of a two-part hinge having a pivot point;

an aft section having a forward end forming the second part of the two-part hinge and a rearward end associated with loading and unloading the containers;

the aft section includes a set of load-bearing wheels, with the hinge being located forwardly of the wheels associated with the aft section;

at least one hydraulic cylinder positioned above the pivot point to control the relative movement of the fore and aft sections between a first position wherein the fore and aft sections lie substantially in the same horizontal plane during container transport, and a second position wherein the cylinder is extended, causing the fore and aft sections to articulate in such a way that the rearward end of the aft section is brought proximate to the ground for container loading and unloading; and means for transferring separate containers onto and off of both trailer sections, including a pair of winches, one associated with each of the fore and aft sections, respectively, and cabling, including container attachment means, moveable between and under the control of the two winches.

11. The articulating trailer of claim 10, wherein the aft section includes a slide assembly for loading and unloading a container onto the aft section.

12. The articulating trailer of claim 10, wherein the fore section includes a slide assembly for loading and unloading a container onto the fore or aft sections.

13. The articulating trailer of claim 10, wherein the degree of articulation is sufficient to dump the contents of a container positioned on the aft section.

14. The articulating trailer of claim 10, wherein the aft section further includes an extensible tail section.

15. The articulating trailer of claim 14, wherein the extensible tail section includes a downward bend enabling containers to be loaded and unloaded at a lesser degree of articulation than would otherwise be possible.

16. An articulating trailer capable of loading, unloading and transporting two containers, comprising:

a fore section having a forward end adapted for attachment to a tractor and a rearward end forming the first part of a two-part hinge having a pivot point;

an aft section having a forward end forming the second part of the two-part hinge and a rearward end associated with loading and unloading the containers;

the aft section includes a set of load-bearing wheels, with the hinge being located forwardly of the wheels associated with the aft section;

at least one hydraulic cylinder positioned above the pivot point to control the relative movement of the fore and aft sections between a first position wherein the fore and aft sections lie substantially in the same horizontal plane during container transport, and a second position wherein the cylinder is extended, causing the fore and aft sections to articulate in such a way that the rearward end of the aft section is brought proximate to the ground for container loading and unloading; and means for transferring separate containers onto and off of both trailer sections, including at least one cable-pulling slide assembly and cabling, including a container attachment means, a moveable under the control of the slide assembly.

* * * * *